Jan. 6, 1970    W. B. FAHRENBACH    3,487,861
TRUSS MAKING AND METHOD
Filed Aug. 29, 1967    6 Sheets-Sheet 1

INVENTOR.
WOLFGANG B. FAHRENBACH
BY
ATTORNEYS

Jan. 6, 1970

W. B. FAHRENBACH

3,487,861

TRUSS MAKING AND METHOD

Filed Aug. 29, 1967

INVENTOR.
WOLFGANG B. FAHRENBACH
BY
*Boykin, Mohler, Foster & Schlemmer*
ATTORNEYS Jan. 6, 1970

W. B. FAHRENBACH

3,487,861

TRUSS MAKING AND METHOD

Filed Aug. 29, 1967

INVENTOR.
WOLFGANG B. FAHRENBACH
BY
Boyken, Mohler, Foster & Schlemmer
ATTORNEYS Jan. 6, 1970  W. B. FAHRENBACH  3,487,861
TRUSS MAKING AND METHOD Filed Aug. 29, 1967  6 Sheets-Sheet 6

INVENTOR.
WOLFGANG B. FAHRENBACH
BY
Boyken, Mohler, Foster & Schlemmer
ATTORNEYS

United States Patent Office 3,487,861
Patented Jan. 6, 1970

3,487,861
TRUSS MAKING AND METHOD
Wolfgang B. Fahrenbach, Oakland, Calif., assignor to Stryco Manufacturing Co., San Francisco, Calif., a corporation of California
Filed Aug. 29, 1967, Ser. No. 667,319
Int. Cl. B21f 45/00, 27/10; B23k 11/00
U.S. Cl. 140—71       7 Claims

ABSTRACT OF THE DISCLOSURE

A truss making machine having means for simultaneously moving a plurality of wires in spaced, side-by-side relation in one direction in paths extending longitudinally of said wires to and past bending and welding stations. Bending means at the bending station bends one wire to form zig-zag lengths between bends and immediately following the formation of each adjacent pair of said lengths means is provided for welding the bends at the end of each such length to a pair of parallel straight wires thereby forming a truss.

Background of invention

Heretofore wall and roof trusses have been formed by bending a length of wire to zig-zag formation to provide a web wire, and thereafter positioning such web wire between a pair of lengths of straight wires and finally welding the web wire at its bends to the straight side wires.

This procedure is long and slow, compared with the present method in which continuous wires are drawn from sources past a point where one is bent and welded to a pair of straight wires after the bends are formed. Except for the momentary welding operations the movement of the wires is continuous.

Summary

The apparatus provides means for performing the steps of simultaneously moving a pair of straight side wires and an intermediate straight wire from continuous sources, in side-by-side relation in one direction along paths extending longitudinally of said wires, and at a point along said paths bending the intermediate wire to a zig-zag form and then welding the bends to the straight side wires to complete the truss.

Description of invention

Figures 1, 2:
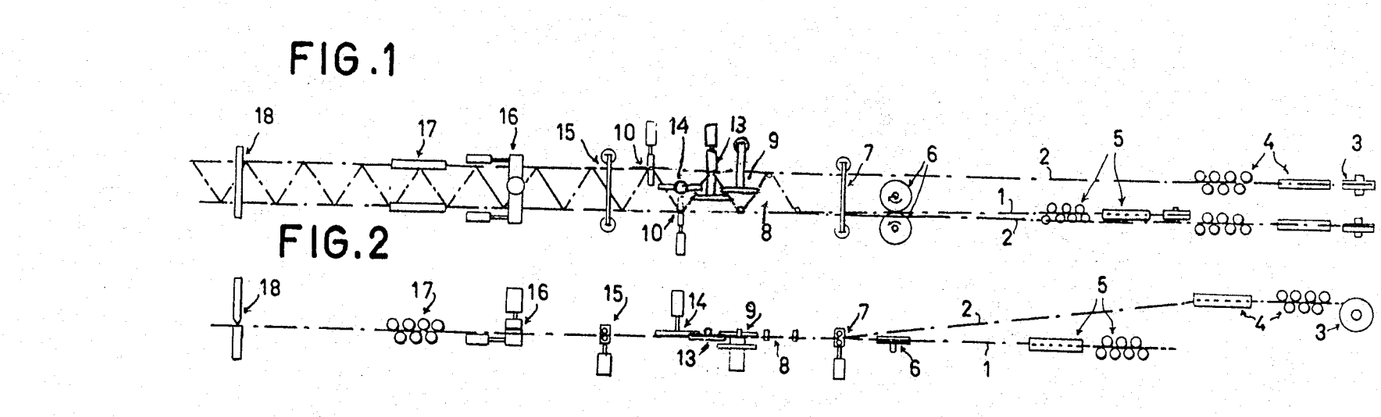
FIG. 1 is a schematic top plan view showing the several stations where different operations occur in the machine in the making of a truss.
FIG. 2 is a schematic side view of the arrangement shown in FIG. 1.

A brief description of the manufacturing steps is illustrated in the schematic views, FIGS 1, 2 in which the three wires are shown in single lines, the wire 1 being intermediate of a pair of spaced wires 2, and which intermediate wire 1 will form the web of the truss. Said wire 1 is the wire that is to be bent to zig-zag form and is to be welded at its bends to the wires 2 in a position coplanar with wires 2.

The wires forming the truss are normally approximately ¼ inch in diameter and of Basic Bright weld quality.

Each of the wires may be drawn from a separate, substantially continuous source, such as coils or spools 3, and it is quite important that there should be no back drag on the wires. The latter should freely unwind from the spools. Any conventional expedients may be used to insure against such back drag.

From spools 3, the wires 2 are drawn through sets 4 of straightening rollers, and wire 1 is drawn through a set 5 of straightening rollers.

After straightening, the web wire 1 is intermittently drawn forwardly, or to the left as seen in FIGS. 1, 2, between a pair of drive rollers 6. The wires 2 are moved forwardly by an advancing mechanism, as will be described later. Drive for the web wire runs simultaneously with the advance of wires 2 but feeds slightly more wire than the advance of wires 2 to avoid skidding of the web wire or objectionable slippage and consequent objectionable bending at the bending point, as will later appear.

After the wires 1, 2 have moved past the location of the drive rollers 6, they are moved through a lifter 7 with the wires 1, 2 in coplanar, horizontally disposed relation. After lifter 7 they are moved to a bending station 8 where a bend is formed in the web wire. At this station a vertically reciprocable hold-down and elevating device 9 lifts the web wire during each advance thereof, and lowers it for bending between each advance.

From the bending station the wires are advanced to a welding station 10 where two of the opposite bends made at the bending station are simultaneously welded to the wires 2.

Between the welding station and the bending station, and during welding, a stretcher or holding device 13 holds the adjacent pair of angularly extending lengths of the web wire that has just been bent, and a lay-down device 14 is operative at the welding station to hold the wires 1, 2 down in the desired coplanar relation during welding.

After welding the truss is moved through a lifter 15 that is identical to lifter 7. The lifters 7, 15 operate simultaneously with the device 9 for lifting the truss and wires relative to the bending and welding units during each advance of the truss and then lower the truss after each such advance. The hold-down portion of the hold-down and elevating device 9 and the lay-down device 14 operate at the same time to positively hold the wire 1 down at the bending and welding stations except when the lifters 7, 15 and the elevating portion of the hold-down and elevating device 9 move upwardly to elevate the truss wires at the bending and welding stations.

At the welding station the wires 2 are brought into and held in welding engagement with the bends of wire 1 by the electrodes at said station, as will be described more in detail in describing the structure of the electrodes, but it is important to note that the stresses in the web wire during the bending operation are not transferred to the welding electrodes, since the wires are held by the holding device 13 against any such transfer.

Beyond the lifter 15, the truss passes to a reciprocable clamping and truss-advancing means 16 that intermittently engages the truss and advances it and wires 2, including the web wire 1 between each bending and welding operation, said bending and welding occurring substantially at the same time.

After the advance means 16, the truss may be moved through sets of straightening rollers 17 operative on the wires 2 and the bends of wire 1 to straighten the truss.

A conventional cutter 18 may cut the truss to the desired lengths, such cutter being, in itself, conventional, and it may be controlled through any suitable control means to automatically cut the truss into said lengths.

The foregoing illustrates steps of a method of making the truss, and the machine incorporates the elements for carrying out each of the steps.

Figure 3:
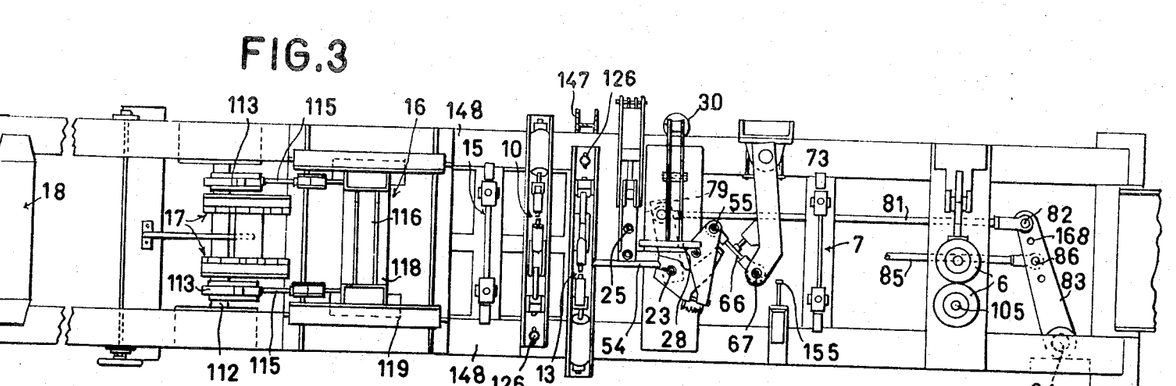
FIG. 3 is a greatly reduced top plan view of the main part of the machine with several portions shown in FIG. 4 omitted for clarity and the support for said portions in cross section.
Figure 4:
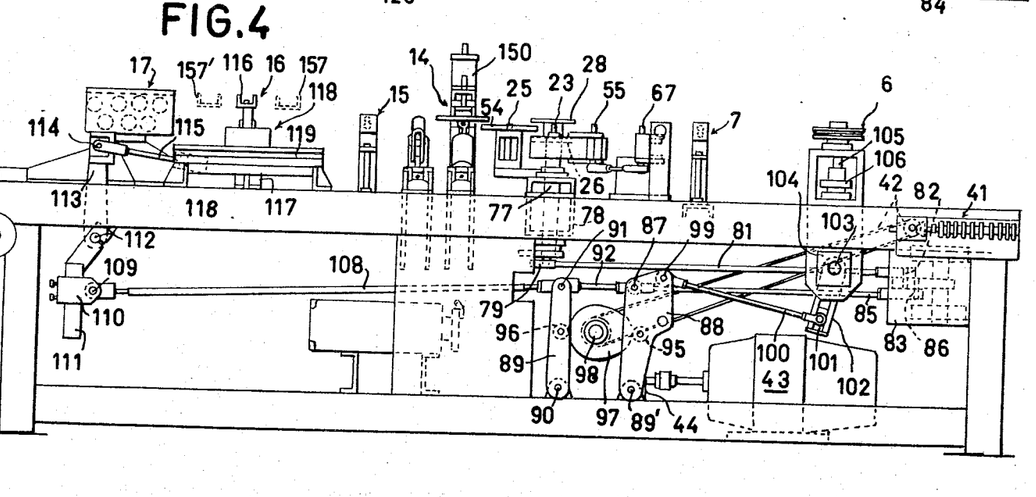
FIG. 4 is a side elevational view of the portion shown in FIG. 3, including the parts omitted in FIG. 3.

Referring to FIGS. 3, 4, the structure of the machine from the drive rollers 6 to the cutter 18 are shown more in detail with the elements at the bending station in bending position.

Figure 5:
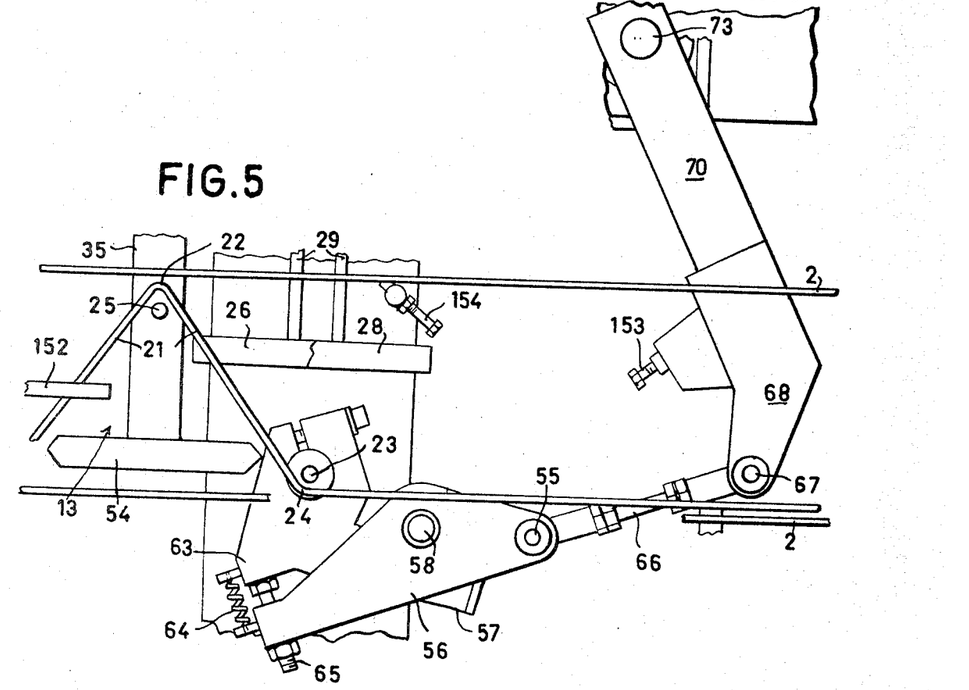
FIG. 5 is a greatly enlarged fragmentary top plan view of a portion of the machine at the bending station preparatory to making a bend in the web wire, and showing the truss wires.

In FIG. 5 the wires 1, 2 are shown at the bending station 8 in positions prior to the operation of making a bend succeeding one that has previously been made. The sides of the immediately preceding V-bend are designated 21, with the bend itself designated 22.

Figure 6:
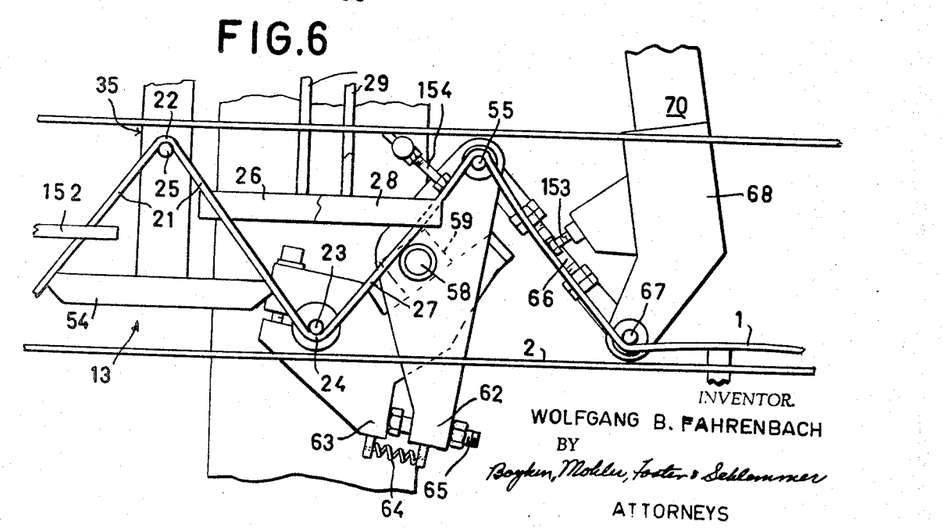
FIG. 6 is a view similar to that of FIG. 5 with the bending elements at the completion of making a bend in the web wire.

In FIG. 6 the bend has been completed and the elements of the bending mechanism are in the same position as in FIG. 3.

A fulcrum pin 23 is provided at the bending station (FIG. 5) in a fixed position for engaging wire 1 within the bend 24 at the juncture between the straight length of wire extending from the drive rollers 6 to one of the ends of one of the sides 21 (FIG. 6), and a holding pin 25 is spaced within the bend 22.

The "forward" movement of the wires 1, 2 is from right to left in FIGS. 1–6, and the words "forward" and "rearwardly" and words of similar connotation will be used with reference to this direction, the forward end of the machine being the left end and the rear end at the right.

Figure 7:
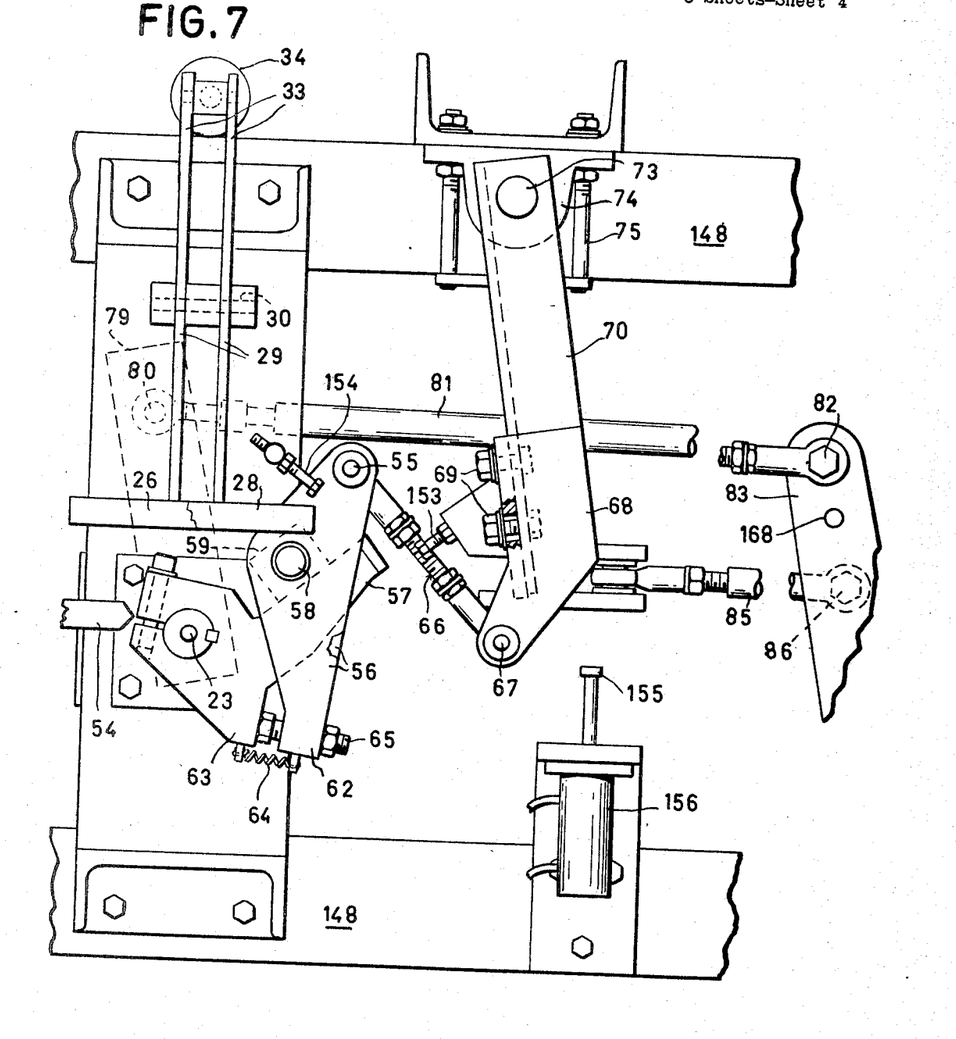
FIG. 7 is a view similar to, but more comprehensive than that of FIG. 6, but omitting the truss wires.

The lifter and hold-down device 9 comprises a horizontal lifting bar 26 (FIGS. 5–7) extending longitudinally of the path of movement of the wires 1, 2 and in a position below the web wire 1 to extend below one leg 21 of a previously formed V-bend and the adjoining portion 27 (FIG. 6) of the next V-bend that is formed. A corresponding hold-down bar 28 corresponding to the bar 26 is spaced above bar 26 and above the web wire 1. These bars 26, 28 are on the ends of corresponding arms 29 spaced above and below the wires 1, 2 and extending laterally to join adjacent to a pivot 30 (FIG. 7) supported in a fixed position on the machine, and an extension 33 connects at its outer end with the plunger of a vertically disposed air cylinder 34 (FIG. 7).

When the cylinder 34 is actuated for effecting downward movement of bars 26 and 28, the hold-down bar 28 holds the wires in the desired plane for bending, with the fulcrum pin 23 within bend 24, and the holding pin 25 within bend 22, and when cylinder 34 is actuated for effecting upward movement of bars 26 and 28, the lifting bar 26 elevates the wires so the web-wire will pass over the pins at the different bends upon forward movement of wire 1.

As seen in FIG. 5, the bend 24 is spaced from the fulcrum pin 23 as is the side 21 of the V provided by the pair of sides 21, which spacing is caused by the drive rollers 6 advancing the web-wire a slightly greater distance with each advance of the wires 2 than the advance of the latter after each bending operation.

Figure 12:
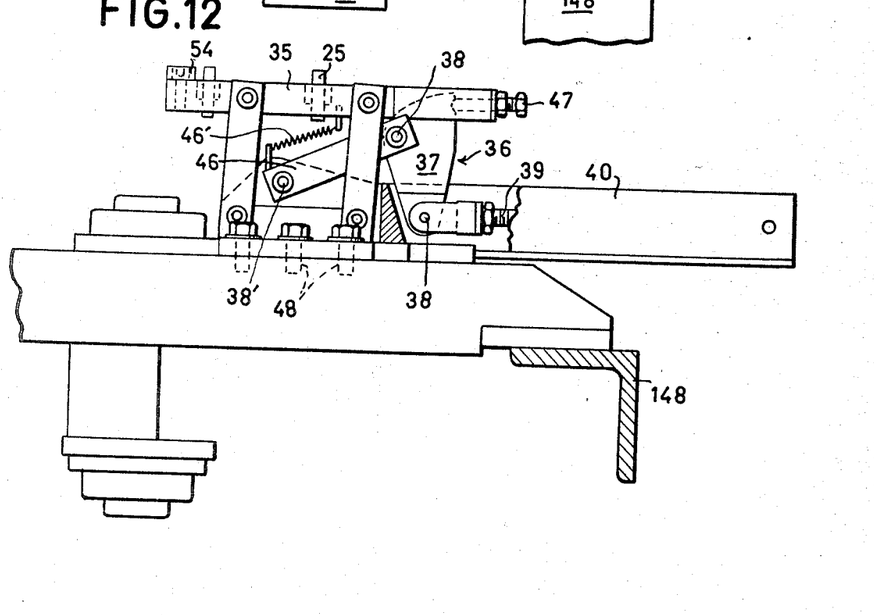
FIG. 12 is a side elevational view of the part shown in FIG. 11, partly broken away and in section.

The holding pin 25 is on and projects upwardly from a horizontally elongated member 35 (FIGS. 5, 6, 11, 12) that is supported for horizontal reciprocable movement longitudinally thereof on a toggle mechanism 36 (FIG. 12).

One element or arm 37 (FIG. 12) of the toggle connection is pivotally connected at 38 to the outer end of an air actuated piston rod 39 extending from a plunger in air cylinder 40 which cylinder, in turn, is connected by a pressure line (not shown) with a cam actuated solenoid valve in conventional valve-cam assembly 41 (FIG. 4) the cams being on a cam shaft operatively driven by a sprocket chain connection 42 with a source of power 43 through a gear box 44.

Each air cylinder hereafter described is connected by air pressure lines with a valve of the valve-cam assembly for actuation at the proper time for performing its intended function. Cam-actuated solenoid valves in fluid lines (not shown) to air cylinders for controlling the movement of plungers and their connecting rods are familiar to those skilled in the art without further showing.

Toggle arm 37 (FIG. 12) is pivotally connected at its end opposite to pivot 38 with the other arm 46 (FIG. 12) of the toggle joint, which, in turn, is pivotally connected at 38' to a fixed portion on the frame of the machine, and a screw 47 on one end of member 35 engages a notch in an extension of arm 37 to adjustably position the holding pin 25, transversely of the truss. The position of the pin 25 longitudinally of the truss is adjustable by loosening bolts 48 (FIG. 11) that extend through slots 49 in the base 50 of the toggle mechanism and into the stationary frame member 53, and then retightening the bolts after the pin 25 is in the desired position longitudinally of said truss. A spring 46' yieldably holds screw 47 in engagement with arm 37.

When the air cylinder 40 is actuated to extend rod 39, the pin 25 will be retracted from the position shown in FIG. 5 to engage the inside of bend 22 and the ends of a cross arm 54 on the outer end of member 35 will engage the adjacent sides 21 of the V in the web wire (FIG. 6) which action occurs just prior to the bending and welding operation.

A bending pin 55 (FIGS. 5–7) is in the same horizontal plane as pins 23, 25, and its axis is parallel with the axes of the pins 23, 25.

Bending pin 55 is spaced along the outer side of the straight length of the web wire 1 that extends from fulcrum pin 23 to the drive rollers 6. By "outer side" is meant the side of wire 1 opposite to the side that is adjacent to pin 23. Both pins 23 and 55 are spaced from wire 2 which also extends past the outer side of pin 23.

The bending pin 55 is secured to the outer ends of a pair of corresponding, spaced, opposed arms 56 which may be considered as one arm, inasmuch as they operate as a unit providing a space between them into which extends the outer end of an arm 57 that is pivotally connected by a pivot 58 with a block 59 (FIG. 7) that is adjustably secured to and disposed between arms 58. The opposite or inner end of arm 57 is rigidly connected with the fulcrum pivot 23.

Spaced from pins 23, 55 and pivot 59 are extensions 62, 63 respectively integral with arms 56, 57 connected by a spring 64 for yieldably urging said extensions toward each other, and an adjustable stop screw 65 carried by extension 62 abuts the extension 63 to limit pivotal movement of arms 56, 57 in one direction, while permitting relative pivotal movement in the opposite direction against the resistance of spring 64.

The bending pin 55, or the coaxial support therefor that extends through the outer ends of the pair of arms 56, is connected with one end of a longitudinally adjustable link 66 (FIG. 7) the opposite end of which is connected with a prebending pin 67. Pin 67 is disposed in the same horizontal plane as pins 23, 55, and said pin is secured on a member 68 that, in turn, is secured by screws 69 on the outer end of an arm 70. The inner or opposite end of arm 70 is pivotally connected at 73 with a member 74 (FIG. 7) which member, in turn, is adjustably secured by bolts 75 on a stationary portion 76 of the frame of the machine.

The pin 67 will be called a pre-bending pin, inasmuch as the pin 67 engages the inner side of the web wire and a bend occurs at said pin 67 when the bending pin is moved against the outer side of the web wire to form a V bend. The term "inner side" as used with reference to the web wire refers to the side nearest a medial line between the wires 2. As already noted, the web wire is adjacent to one of the wires 2 and is considerably to one side of said medial line.

The pre-bending pin 67 is positioned between the wire 2 that is adjacent to the web wire 1, and fulcrum pin 23 is secured on the upper end of a vertical shaft 77 (FIG. 4) which shaft, in turn is rotatably supported in bearings on a member 78. Member 78 is rigid with the frame of the machine. The end of shaft 77 opposite to pin 23 projects from member 78 and one end of an arm 79 (FIG. 7) is secured to said projecting end and extends radially from said shaft.

The end of arm 79 remote from shaft 77 is connected by a pivot 80 to one end of a rod 81. The opposite end of rod 81 is connected by a pivot 82 (FIG. 7) to the outer end of an arm 83, and the inner end of arm 83 is connected by a pivot 84 (FIG. 3) with a portion of the frame of the machine.

A second rod 85 is connected at one end thereof by a pivot 86 to arm 83 at a point adjacent to pivot 82 and spaced between pivots 82, 84. The other end of rod 85 is connected by a pivot 87 (FIG. 4) to upper end of a vertically elongated member 88, which member, in turn, is connected at its lower end to the frame of the machine by a pivot 89'.

Parallel with member 88, and spaced alongside the latter is a second vertically elongated member 89. Member 89 is connected at its lower end to the frame of the machine by a pivot 90 that is spaced alongside pivot 89. A pivot 91 connects the upper end of member 89 with one end of a link 92, and the opposite end of link 92 is connected with pivot 87.

The parallel pair of vertically extending members 88, 89 each has a cam follower thereon intermediate their ends, the follower on member 88 being 95, and the one on member 89 being designated 96. Between said followers is a cam 97 that is in engagement at opposite edges thereof with said followers.

Cam 97 is secured on a shaft 98 that projects from gear box 44 with which motor 43 is connected and which shaft is driven by said motor. Shaft 98 has one of the sprockets of the chain sprocket assembly 41 to the valve cam assembly 42 for driving the latter, (FIG. 4).

A pivot 99 on the upper end of member 88 connects the member 88 with one end of a link 100. The other end of link 100 is pivotally connected with a block 101 that is adjustable to different positions along an arm 102. Arm 102 is secured on a shaft 103 that, in turn, is connected by gears (not shown) in a box 104 with shafts 105 through a conventional one-way, or over-running clutch 106.

Shafts 105 have the drive rollers 6 thereon and upon movement of rod 100 in one direction the rollers will be driven to advance wire 1, while there will be no movement of the rollers upon movement of the rod 100 in the opposite direction. Obviously any other suitable means may be employed to drive the web-wire by the drive rollers, such as applying pressure on the wire by one roller to drive the wire and relaxing the pressure to free the wire from the driving pressure.

Figure 10:
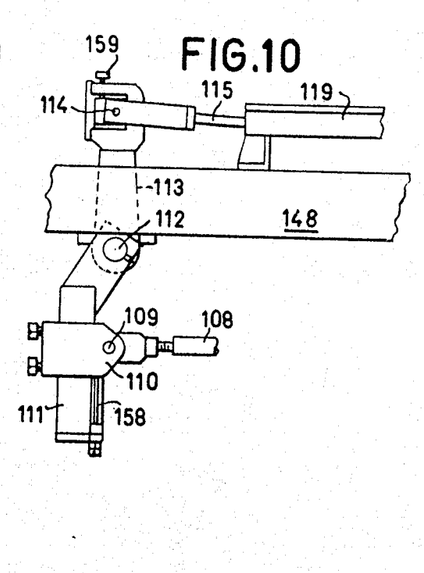
FIG. 10 is a reduced size view of a means for adjusting the length of the pitch of the web wire and which is seen in FIG. 4.
Figure 11:
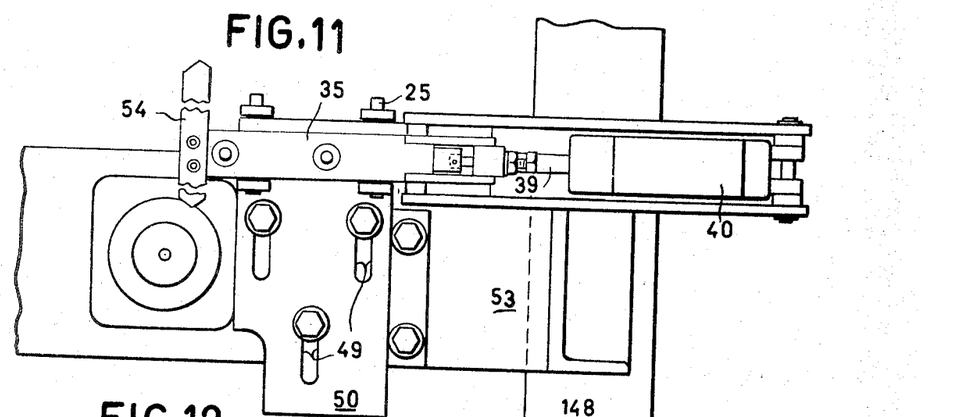
FIG. 11 is an enlarged top plan view of a portion of the machine shown in FIG. 3, turned 90 degrees from the position shown in FIG. 3.

Referring back to the vertical member 89 (FIG. 4), the pivot 91 at its upper end is also connected with one end of a rod 108 (FIG. 4) and a pivot 109 (FIGS. 4, 10) at the opposite end of rod 108 connects the rod with a member 110 that, in turn, is adjustable to different positions on one end of an arm 111.

The other end of arm 111 is adjustably secured on a shaft 112 that is supported for rotation in bearings on the frame of the machine, and a pair of elements 113 (FIGS. 4, 5) secured to shaft 112 project upwardly therefrom. The upper ends of said elements 113 have pivots 114 connecting them with one of the ends of a pair of rods 115. Rods 115, in turn, are pivotally connected at their opposite ends with the truss advancing means 16 that includes a vertically reciprocable horizontal clamping bar 116 connected with the air actuated plunger of an air cylinder 117 for downward movement to clamp the truss between bar 116 and a portion of the slide 118 that supports the bar 116 and air cylinders for horizontal reciprocable movement on guides 119 according to the throw of elements 113, the movement of the latter being such as to advance the truss wires the desired distance for positioning the latter at the bending station after each bend is made.

At each dwell period of the truss, two welds are made by two independent welding circuits, each containing a pair of electrodes 123, 124 (FIGS. 13–15), a single phase transformer, and control. The two circuits may be connected to different phases, if some distribution is desired.

Figure 13:
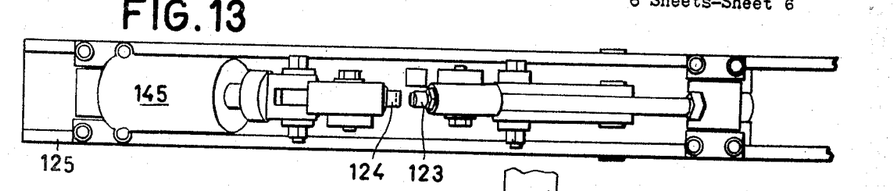
FIG. 13 is an enlarged top plan view of a portion of the machine shown in FIG. 3 at one of the welding points, the portion of the machine shown in FIG. 3, turned 90 degrees from the position shown in FIG. 3.
Figures 14, 15:
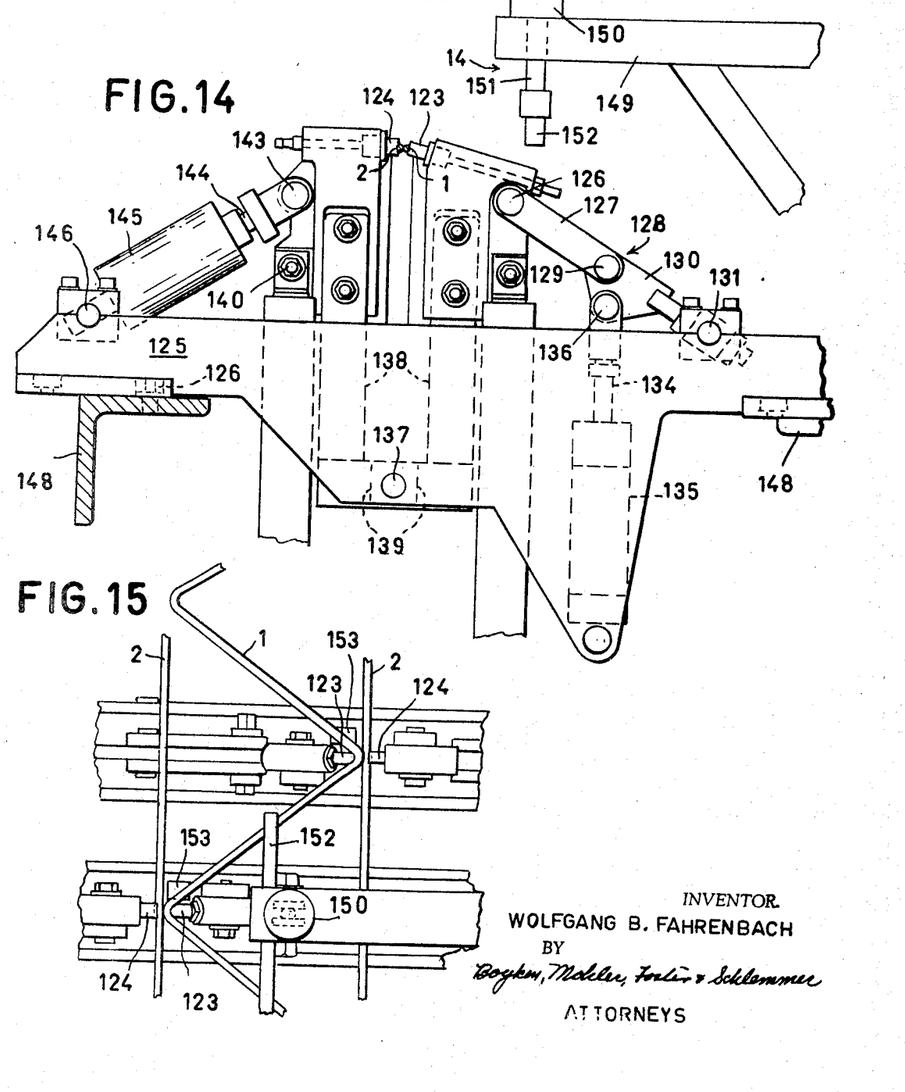
FIG. 14 is a fragmentary part sectional and part elevational view of the part shown in FIG. 13, and which includes added parts.
FIG. 15 is an enlarged, fragmentary top plan view showing the truss at the welding station.

Each pair of electrodes is self-contained in a separate bridge 125 which is adapted to be bolted to the frame of the machine in different positions by bolts 126 according to the width of the truss, the latter normally being either 8" or 4" widths, as will later be explained more in detail.

Electrodes 123 are the inner electrodes, and 124 are the outer ones. Each inner electrode is pivotally connected by a pivot 126 (FIG. 14) with one of the elements 127 of a toggle assembly 128, which element 127 is pivotally connected at 129 with the other element 130 of said assembly, and the latter is pivotally connected at 131 with the bridge 125. The plunger rod 134 of an air cylinder 135 is connected by a pivot 136 with element 130 for actuation of the toggle joint to move electrode 123 to a predetermined position against the inner side of the bend of the web wire for welding the bend to a wire 2.

The toggle joint limits the movement of each electrode 123 into the bend of the web-wire, and locks the electrode against movement under the force of the other electrode 124 when the latter is actuated to move wire 2 against the bend.

The electrodes of each pair are swingable about a pivot 137 (FIG. 14), the electrodes being respectively adjustably secured to the upper ends of arms 138, which arms have lower lateral offset portions 139 extending in lapping relation for support by pivot 137.

The outer electrode 124 of each pair is swingable about a pivot 137 against the straight side wire 2 that is between it and the bend in wire 2 that is to be engaged by an inner electrode, and said outer electrode is pivotally connected at 143 to plunger rod 144 of an air cylinder 145 that, in turn, is pivotally connected by a pivot 146 with the bridge 125. Upon actuation of the air cylinder the electrode 124 will apply a pressure of approximately 700 pounds against the wires at the welding point for a ¼" wire.

The end faces of electrodes 123, 124 are grooved to receive the wires 1, 2, and in the outer electrode, the groove must be slightly convex longitudinally of the groove with the highest point on the center line of the web bend.

In the inner electrodes, the groove must be radiused with ¼" or less so that it fits easily into the web bend and all electrodes must be kept in vertical adjustment at exactly the level of the truss wires when they are held down.

The force applied to the wires at the welding point may vary for different wire quality and electrode forms.

Disposed over the wires at the welding station and supported on a post 147 (FIG. 3) rigid with one of the side frame members 148 of the machine, is a horizontally extending arm 149 (FIG. 14) that carries a vertically disposed air cylinder 150, from which its plunger rod 151 depends, and on the lower end of said rod is a horizontally extending lay-down bar 152 of the laydown device 14 of FIG. 1, which bar is adapted to hold the wires on a block 153 (FIG. 15) of insulating material at each of the bends in wire 1 that are to be welded to wires 2.

In operation the motor 43 that drives all parts of the machine may be running continuously and the web-wire 1 is intermittently advanced by the drive rollers 6 while the wires 2 are advanced at the same time by the movement of the clamping member 116 of the advancing device 16, but the rollers 6 advance the wire 1 a slightly greater distance than wires 2 in order to provide the spacing between the fulcrum pin 23 and bend 24. Web-wire 1 is formed with an initial bend outside the machine at the start, but thereafter a bend will remain.

The clamping member 116 will be elevated by actuation of air cylinder 117 after each advance of the wires 2 and during its return for a subsequent advance the driving rollers are inoperative for advancing the web-wire 1.

The conventional cam valve assembly 41 controls the operation of all air cylinders, and it is continuously driven by motor 43.

As soon as the wires 1, 2 are in the position shown in FIG. 5, the holding device comprising pin 25 and cross bar 54 are actuated to firmly hold the web wire against any stress being transmitted to the welding electrodes, and the laydown bar 152 holds the web-wire 1 and side wires 2 against blocks 153 for welding at the bends in wire 1. The electrodes 123, 124 then weld the side wires 2 to the bends in the web-wire, and during this time the bending pin 55 is swung into engagement with the web-wire moving the bend 24 into engagement with the fulcrum pin 23, so there can be no distortion of the web-wire due to drag or skidding between the wire and the pin as would be the case were the wire at the bend 24 initially against pin 23. The bending pin also effects movement of wire 1 against the prebending pin 67 and continued movement of the bending pin 55 will form the desired bend, such as bend 24 of the immediately preceding bend (FIG. 6).

It is pertinent to note at this point that the arm 70 (or member 68 on arm 70) carries an adjustable overbending member 153 which is positioned at one side of the bending pin 55, and a similar overbending member 154 is adjustably secured at the opposite side of said pin 55 when the pin 55 is at the end of its bending movement, which members respectively engage the lengths of wire 1 extending away from pin 55 to compensate for the spring-back of said lengths when the pin 55 is moved out of the bend and back to the position shown in FIG. 5.

The pivotal movement between the arms 56 and arms 57 is to enable said movement of pin 55 inasmuch as the angle of the lengths of wire 1, one of which is length 27, (FIG. 6) is at less than a right angle.

Another member 155 (FIG. 7) is on the plunger rod of an air cylinder 156. The latter is supported on one of the frame members 148 in a position to engage the length of wire 1 that extends to the prebending pin 67 for engaging said wire 1 adjacent to the pin 67 to prevent undesirable distortion of the portion engaged by said member during the bending operation. This member 155 and members 153, 154 are operative only during the dwell period of the web.

After a welding operation, the holding pin 25 and the bar 54 are relaxed by release of the air pressure in cylinder 40 (FIG. 11) so that the truss wires can be readily lifted by lifters 7, 15 and 26 before the truss wires are advanced, to permit them to clear the pins 23, 25, 55, upon their advance.

As soon as the welding and bending operations are complete, the clamping bar 116 will have been moved to dotted position 157 and into clamping relation to the truss therebelow for advancing the truss to position 157' and the lifters 7, 15, 26 will then be actuated to lift the wires, and the wires 1, 2 will be advanced by advance of the bar 116 and actuation of drive rollers 6. Wire 1, of course, is driven separately from wires 2, the former being driven to the bending station and the latter being drawn thereto and therefrom by the device 16. The pitch length of the web-wire, hence the accuracy of the trusses is determined by the advance drive. The pitch length of the web-wire may be determined by the position of pivot 109 (FIG. 4) along arms 11 and a finer adjustment may be made by screws 159 that adjust the position of pivots 114 on elements 113.

The clamp carriage is free for a limited amount of movement sideways.

The feed length of the web-wire can be finely adjusted by adjusting the position of the pivot supporting block 101 on arm 102 (FIG. 4).

Figure 9:
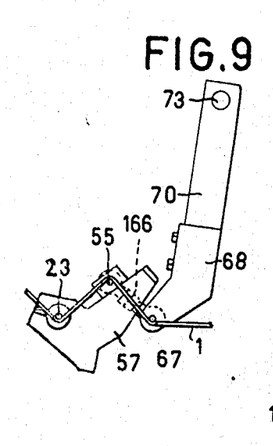
FIG. 9 is similar to FIG. 8, but shows a modification to adapt the machine to make truss of one-half the width of truss indicated in FIG. 6.

The machine is adapted for forming different width trusses. For example, the arrangement shown in the drawings, with the exception of FIG. 9, and except for adjustments that are provided for the machine, the machine will form a truss that is eight inches in width. The electrodes are constructed, as described, to be moved to adjusted positions.

Figure 8:
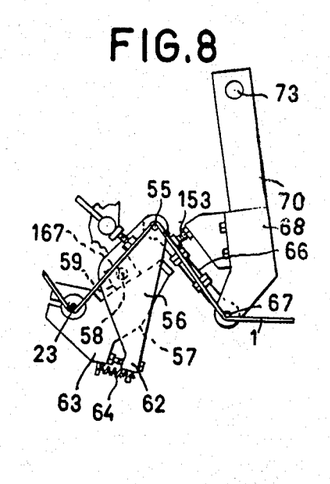
FIG. 8 is a reduced size view of a portion of the machine seen in FIG. 6, which portion is detached from the machine.

By substituting a short link 166 (FIG. 9) for the link 66 (FIG. 8) and positioning pin 55 in the opening 167 provided therefor in arm 57, not only will pins 23, 67 be moved closer together but the width of the truss will be halved. The angle between the adjoining lengths of each V is now such that the pin 55 can be released without articulating it with arm 56 hence the latter may be omitted.

Different holes 168 in arms 83 are provided for differently positioning pivots 82, 86 and the various connecting rods are adjustable for length. All these adjustments enable the making of straight and accurate trusses. The straighteners of the trusses is dependent on the initial straighteners of the longitudinal wires, the correct bending of the web-wire, the proper positioning of the holding pin 25 and the inner electrodes 123, the straight pull of the advance carriage carrying clamp 116, and the setting of the straightening rollers 17. Any one of the above factors may be responsible for deviation of camber or twist, and the most critical tolerances (camber) is controlled best with the inner electrodes 123 and the holding pin 25, mostly with a slight adjustment of the first inner electrode nearest to the holding pin.

It should be understood that the above detailed descripion discloses the preferred methods and forms of the present invention but it is not intended to be limiting, as other methods and forms may occur to those skilled in the art which do not depart from the spirit of this invention and which come within the scope of the appended claims.

I claim:

1. The method of making roof and wall trusses that comprises the steps of;
   (a) moving a pair of spaced side wires in spaced side-by-side, substantially parallel relation, in one direction along a pair of spaced paths extending longitudinally of said side wires and at the same time moving a web-wire positioned between said side wires in said one direction along a path parallel with said side wires and in the same plane as said side wires, (b) uniformly bending equal sections of said web-wire in succession at a bending station along its said path to provide a zig-zag pattern with the bends thereof along a pair of lines respectively adjacent to and substantially parallel with and between said spaced side wires, then (c) welding said web-wire at each bend to the side wire adjacent thereto at a welding station along said path following the bending of said web-wire at said bending station, (d) holding said web-wire stationary at a location between said welding station and said bending station against transmission of stresses from said bending station to said welding station during welding of said web-wire to said side wires by providing a fully completed intermediate return bend of said web-wire between said welding station and said bending station and positioning a rigid holding member within said intermediate return bend stationary against movement in said one direction whereby transmission of bending stresses along said web-wire to said welding station will be obstructed by engagement of said welding wire at said intermediate return bend with said holding member, and at the same time engaging the lengths of said web-wire extending to said intermediate return bend by a force applied to the inner sides of said lengths within the angle of said return bend at points equally spaced from said intermediate return bend and in a direction generally toward said intermediate return bend.

2. The method of making roof and wall trusses that comprises the steps of:

(a) moving a pair of spaced side wires in spaced side-by-side, substantially parallel relation, in one direction along a pair of spaced paths extending longitudinally of said side wires and at the same time moving a web-wire positioned between said side wires in said one direction along a path parallel with said side wires and in the same plane as said side wires, (b) uniformly bending equal sections of said web-wire in succession at a bending station along its said path to provide a zig-zag pattern with the bends thereof along a pair of lines respectively adjacent to and substantially parallel with and between said spaced side wires, then (c) welding said web-wire at each bend to the side wire adjacent thereto at a welding station along said path following the bending of said web wire at said bending station, (d) positively drawing said side wires and said web-wire in said one direction away from said welding station under a drawing force, substantially immediately after welding said web-wire to said side wires at said station, and at the same time (e) positively driving said web-wire to said bending station to advance said web-wire to said bending station a slightly greater distance than the advance of said side wires to said bending station under said drawing force.

3. In apparatus for making roof and wall trusses of the type including a pair of substantially straight and substantially parallel side wires in spaced side-by-side relation, and having an intermediate web-wire of zig-zag form between said side wires with a bend at the ends of each adjoining zig and zag section welded to said side wires, and which apparatus includes a frame having a bending station for bending said web-wire to said zig-zag form and a welding station including welding electrodes for welding said web-wire at its bends to said side wires;

(a) supporting means for supporting said pair of side wires in said spaced side-by-side relation for movement in one direction longitudinally thereof to and past said welding station, and for supporting said web-wire for movement in said one direction to and past said bending station and said welding station, in succession, with said web-wire in a substantially straight condition during movement thereof to said bending station and in a position adjacent to one of said side wires and between said side wires at said bending station and in the plane in which said pair of side wires is disposed, (b) bending means at said bending station comprising a pair of wire-engaging pins adjacent to said web-wire between said web-wire and the side wire remote therefrom extending across the plane in which said side wires are positioned at said bending station and spaced longitudinally of said web-wire, and a bending pin extending across said plane between said web-wire and the side wire adjacent thereto and spaced between said pair of wire-engaging pins when said web-wire is in said straight condition at said bending station, (c) means connected with said bending pin for moving it in said plane across the space between said pair of side wires to form a pair of adjoining zig and zag sections and a bend at their junctures, (d) means for moving said pair of side wires and said web-wire intermittently in said one direction to said welding station after each pair of zig and zag sections is formed at said bending station, (e) holding means between said bending station and said welding station for holding said web-wire stationary and against transmission of tension in said web-wire to said welding electrodes during bending of said web-wire at said bending station, (f) said holding means including a holding pin between said web-wire and said one of said side wires extending across said plane, and (g) means on said frame connected with said holding pin for moving said pin into tight engagement with said web-wire within a bend in said web-wire positioned between said welding station and said bending station whereby said bending stresses at said bending station will be stopped at said pin by engagement of a side of said web-wire within said bend with said holding pin.

4. In apparatus as defined in claim 3:

(h) wire-engaging means connected with said holding means for movement therewith into engagement with the lengths of said web-wire extending to the bend therein engaged by said holding pin at equally spaced points spaced from said last-mentioned bend and within the angle of said bend, upon said holding pin engaging said last-mentioned bend.

5. In apparatus for making roof and wall trusses of the type including a pair of substantially straight and substantially parallel side wires in spaced, side-by-side relation, and having an intermediate web-wire of zig-zag form with a bend at the ends of each adjoining zig and zag section welded to said side wires, and which apparatus includes a frame having a bending station for bending said web-wire to said zig-zag form and a welding station for welding said web-wire at its bends to said side wires;

(a) supporting means for supporting said pair of side wires in said spaced side-by-side relation for movement in one direction longitudinally thereof to and past said welding station, and for supporting said web-wire for movement in said one direction to and past said bending station and said welding station with said web-wire in a substantially straight condition during movement thereof to said bending station in a position adjacent to one of said side wires and between said side wires in the plane in which said pair of side wires is disposed, (b) bending means at said bending station for bending said web-wire to said zig-zag form, (c) said welding station being beyond said bending station in said one direction, and two pairs of welding electrodes at said welding station being in a position with one of the electrodes of each pair comprising an inner electrode at the inside of the bends of adjoining pairs of zig and zag sections and with the other electrodes of said pairs comprising outer electrodes adjacent to the outer sides of said pair of side wires and respectively opposed to said inner electrodes, (d) means for moving said inner electrodes into welding engagement with the inner sides of the bends adjacent zig and zag sections of said adjoining pairs thereof, (e) said bending means comprising a pair of wire engaging elements extending across said plane disposed between said side wires and spaced longitudinally of said web-wire at the same side thereof and a bending pin spaced between said pair of wire engaging elements at the side of said web-wire opposite to said pair of elements when said web-wire and said side wires are at said bending station and said bending pin is in a prebending position, (f) means connected with said bending pin for moving it in said plane across and past the space between said pair of elements to form a pair of adjoining zig and zag sections and a bend at their juncture, (g) means for returning said bending pin to its prebending position after forming said bend, and (h) means for advancing said web-wire and said side wires in said one direction a distance substantially equal to the distance between said pair of elements after said bending of said web-wire to form said sections.

6. In apparatus for making roof and wall trusses of the type including a pair of substantially straight, parallel side wires and an intermediate web-wire of zig-zag form with a bend at the ends of each adjoining zig and zag section welded to said side wires, and which apparatus includes a frame having a welding station, a bending station, and bending means at said bending station for bending said web-wire from a straight condition to zig-zag form prior to welding said web-wire to said side wires;

(a) supporting means on said frame for supporting said pair of side wires and said web-wire in horizontally-spaced, horizontally-extending, side-by-side relation in one plane for movement in one direction longitudinally of said wires to said bending station in substantially straight condition at said bending station with said web-wire between said side wires and adjacent to one of the latter and remote from the other, (b) said bending means including a pre-bending pin, a bending pin, and a rotatably-supported stationary pin alongside said web-wire and spaced apart in the direction of movement of said web-wire when the latter is in said straight condition with said bending pin nearest said welding station and said bending pin between said stationary pin and said pre-bending pin, (c) means for supporting said pre-bending pin and said stationary pin in positions at one side of said web-wire between said web-wire and the side wire remote therefrom when said web and side wires are in said straight condition at said bending station, (d) means for supporting said bending wire in a position at the side of said web-wire opposite to said one side for movement in said plane of said wires toward the side wire remote from the side wire adjacent thereto when said wires are in said straight position for forming one of the zig-zag sections of said web-wire, (e) said means for supporting said bending pin including means swingably supporting said bending pin for movement in a direction generally toward said stationary pin and against movement in an opposite direction to facilitate return movement of said bending pin out of the angle formed in said web-wire after said zig-zag section has been formed, (f) said means swingably supporting said bending pin including an arm secured at one end to said stationary pin for moving said bending pin to form said zig-zag portion when said stationary pin is rotated in one direction, (g) and means operatively connected with said stationary pin for so rotating the latter to swing said arm in said one direction for bending said web-wire.

7. In apparatus for making roof and wall trusses of the type including a pair of substantially straight and substantially parallel side wires in spaced side-by-side relation, and having an intermediate web-wire of zig-zag form with a bend at the ends of each adjoining zig and zag section welded to said side wires, and which apparatus includes a frame having a bending station for bending said web-wire to said zig-zag form and a welding station for welding said web-wire at its bends to said side wires;

(a) supporting means for supporting said pair of side wires in said spaced side-by-side relation for movement in one direction longitudinally thereof to and past said welding station, and for supporting said web-wire for movement in said one direction to and past said bending station and said welding station with said web-wire in a substantially straight condition during movement thereof to said bending station in a position adjacent to one of said side wires and between said side wires in the plane in which said pair of side wires is disposed, (b) bending means at said bending station for bending said web-wire to said zig-zag form, (c) said welding station being beyond said bending station in said one direction, and two pairs of welding electrodes at said welding station being in a position with one of the electrodes of each pair comprising an inner electrode at the inside of the bends of adjoining pairs of zig and zag sections and with the other electrodes of said pairs comprising outer electrodes adjacent to the outer sides of said pair of side wires and respectively opposed to said inner electrodes, (d) means for moving said inner electrodes into welding engagement with the inner sides of the bends adjacent zig and zag sections of said adjoining pairs thereof, (e) means for releasably locking said inner electrodes against movement under the influence of pressure from said outer electrodes against said side wires at the bends of said web-wire in engagement with said inner electrodes, and (f) means for moving said outer electrodes against said side wires at said last-mentioned bends for moving and for forcing said web-wire and said side wires together under pressure at said bends.

References Cited
UNITED STATES PATENTS

| | | | |
|---|---|---|---|
| 2,485,282 | 10/1949 | Green | 140—71 |
| 2,722,242 | 11/1955 | Talbot | 140—71 |
| 2,792,852 | 5/1957 | Talbot, et al. | 140—112 |
| 3,310,075 | 3/1967 | Larkin | 140—112 |

CHARLES W. LANHAM, Primary Examiner

LOWELL A. LARSON, Assistant Examiner